United States Patent
Bou-Ghannam et al.

(10) Patent No.: US 7,289,989 B2
(45) Date of Patent: Oct. 30, 2007

(54) PATTERN BASED WEB SERVICES

(75) Inventors: Akram A. Bou-Ghannam, Lake Worth, FL (US); Thomas E. Creamer, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/706,179

(22) Filed: Nov. 12, 2003

(65) Prior Publication Data

US 2005/0102350 A1 May 12, 2005

(51) Int. Cl.
G06F 7/00 (2006.01)
G06F 17/30 (2006.01)
(52) U.S. Cl. .......................................... 707/6; 709/224
(58) Field of Classification Search ................ 707/6, 707/10, 100; 709/224
See application file for complete search history.

(56) References Cited

U.S. PATENT DOCUMENTS

| 6,289,382 | B1 | 9/2001 | Bowman-Amuah |
| 2001/0018674 | A1 | 8/2001 | Schein et al. |
| 2002/0049858 | A1 | 4/2002 | Frietas et al. |
| 2002/0091533 | A1 | 7/2002 | Ims et al. |
| 2002/0143945 | A1 | 10/2002 | Shahabuddin et al. |
| 2002/0186826 | A1 | 12/2002 | Hsu et al. |
| 2003/0009545 | A1 | 1/2003 | Sahai et al. |
| 2003/0036919 | A1 | 2/2003 | Fetl et al. |
| 2003/0039215 | A1 | 2/2003 | Eatough et al. |
| 2003/0040920 | A1 | 2/2003 | Adams et al. |
| 2003/0188039 | A1* | 10/2003 | Liu et al. .................... 709/315 |
| 2004/0015578 | A1* | 1/2004 | Karakashian et al. ....... 709/223 |
| 2004/0122926 | A1* | 6/2004 | Moore et al. ............... 709/223 |
| 2005/0038708 | A1* | 2/2005 | Wu .............................. 705/26 |

OTHER PUBLICATIONS

Dzbor et al., ISWC 2003; International Sematic Web Conference No. 2, Sanibel Island, FL, USA, Oct. 2003, pp. 690-705, (presented as pp. 1-16).*
U.S. Appl. No. 10/615,504, Bazot, et al.
Fournier, R., et al., "Application Service Portal for Multi-Company, Multi-Service Offerings", Research Disclosure, No. 444, Art. 165, pp. 658-659, Apr. 2001.
Shrader, T., "Design for a Simple Network Management Protocol Subagent for Internet Firewalls", IBM Technical Disclosure Bulletin, Vo. 40, No. 03, pp. 63-68, Mar. 1997.
Flaxer, D., et al., "Method of Enabling Automated Invocation of Web Services", Research Disclosure, No. 455, Art. 132, pp. 492-494, Mar. 2002.

* cited by examiner

Primary Examiner—Cheyne D. Ly
(74) Attorney, Agent, or Firm—Akerman Senterfitt

(57) ABSTRACT

A method of processing a request for a plurality of Web services can include receiving a request specifying at least two Web services, storing an object pattern from the request in a common memory, and scanning the common memory with a plurality of watchers. Each watcher can be associated with a Web service and can specify a rule for invoking an associated one of the Web services. The method also can include detecting that the object pattern matches a rule of at least two of the watchers, wherein each watcher having a rule matching the object pattern invokes an associated one of the Web services.

17 Claims, 2 Drawing Sheets

PATTERN BASED WEB SERVICES

BACKGROUND

1. Field of the Invention

The invention relates to the field of Web services and, more particularly, to invoking Web services using a pattern-based approach.

2. Description of the Related Art

Web services, also referred to as application services, are services that are made available from Web servers for Web users or other Web-connected applications. Providers of Web services generally are known as application service providers. Web services can range from such major services as storage management and customer relationship management to much more limited services such as the furnishing of a stock quote or the checking of bids for an auction item. Other examples of Web services can include, but are not limited to, services that provide a telephone number in response to a provided name and services that return one or more electronic mail addresses for a provided name.

Web services typically are request response based and follow the client/server model. That is, a request from a client is sent to a server for fulfillment. Typically, the request is provided to the server formatted according to Remote Procedure Call (RPC) protocol. In general, RPC enables one application, the client, to request a service from another application, the server. RPC allows the client, operating in one computer system, to issue the request to the server, operating in a different computer system within a network. The client application, need not have an understanding of the operational details of the network to make a request of the server application when using RPC.

The request can be sent using Simple Object Access Protocol. In other words, a SOAP message containing RPC information is sent to the server. The server can then process the received request and provide a response to the client. SOAP is a protocol that enables a program running in one kind of operating system to communicate with a program in the same or another kind of an operating system, and also computer system, by using the Hypertext Transfer Protocol (HTTP) and Extensible Markup Language (XML) as mechanisms for information exchange. SOAP specifies how to encode an HTTP header and an XML file so that a program in one computer can call a program in another computer as well as pass information.

Presently, the Web service paradigm specifies a procedure in which a request pertains to a single Web service. More particularly, each request initiates a single Web service and, therefore, is directed to a particular service provider. As such, to perform more complex actions involving more than one Web service, the client must issue a series of requests where each request is sent to a different Web service. That is, each constituent task of an action must be submitted to an appropriate Web service as a request.

If the tasks constituting the action are hierarchical in nature, such that one Web service requires information from another Web service to function, the requests must be issued to each Web service in proper order. In such cases, the client must receive a response from a given Web service so that the retrieved information can be used to build the request to be submitted to the next Web service in the hierarchy of Web services constituting the action to be performed.

SUMMARY OF THE INVENTION

The present invention provides a method, system, and apparatus for processing complex requests for Web services. The present invention can receive complex requests, or requests that specify more than one Web service to be performed. Each Web service specified by the received request can be invoked either in parallel or serial fashion. Once each Web service specified by the request has completed execution, or when another termination criterion has been met, a response can be generated and forwarded to the requesting entity.

One aspect of the present invention can include a method of processing a request for one or more Web services. The method can include receiving a request specifying at least two Web services, storing an object pattern from the request in a common memory, and scanning the common memory with two or more watchers. Each watcher can be associated with a Web service and can specify a rule for invoking an associated one of the Web services. The method also can include detecting that the object pattern matches a rule of at least two of the watchers. Accordingly, each watcher having a rule matching the object pattern can invoke an associated one of the Web services.

The method also can include extracting the object pattern from the request prior to the step of storing the object pattern. In one embodiment of the present invention, each watcher can scan the common memory in parallel such that more than one Web service can be invoked concurrently. In another embodiment, two or more of the watchers of the detecting step can invoke an associated one of the Web services sequentially. In any case, the method can include at least one of the watchers modifying the pattern object according to instructions received from an associated one of the Web services.

In another embodiment of the present invention, at least one of the invoked Web services can instruct an associated one of the watchers to modify the object pattern. In that case, the associated one of the watchers can modify the object pattern according to instructions from the associated Web service. A different watcher can determine that the modified object pattern matches at least one rule of the different watcher. Accordingly, the different watcher can invoke the Web service corresponding to the different watcher.

Watchers can continue to invoke Web services until a termination watcher detects a termination criterion and removes the pattern object from the common memory. Accordingly, a response can be sent to the request. The response can specify, at least in part, the pattern object.

Another aspect of the present invention can include a server for processing complex requests for Web services. The server can include a Hypertext Transfer Protocol server configured to receive a request for more than one Web service, at least one servlet configured to extract a pattern object from the request and to format a response to the request, a common memory that temporarily stores the pattern object while the Web services specified by the pattern object execute, and a plurality of watchers. Each watcher can correspond to a particular Web service and include a rule for invoking the associated Web service. Accordingly, each of the watchers can scan the common memory in parallel to determine whether a stored pattern object matches the rule for invoking an associated one of the Web services. The system also can include a termination watcher configured to detect a termination criterion. The termination watcher can provide the pattern object back to one of the plurality of servlets to generate a response when the termination criterion is detected.

The watchers can scan the common memory in parallel such that more than one Web service can execute concurrently. Still, the watchers can invoke more than one Web service in a sequential fashion. The watchers also can modify the pattern object according to instructions provided from an associated one of the Web services. Notably, an invoked Web service can instruct an associated watcher to modify the object pattern such that a different one of the watchers may determine that the modified object pattern matches a rule and invokes the Web service corresponding to the different one of the watchers.

Other embodiments of the present invention, when configured in accordance with the inventive arrangements disclosed herein, can include a system for performing, and a machine readable storage for causing a machine to perform, the various processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
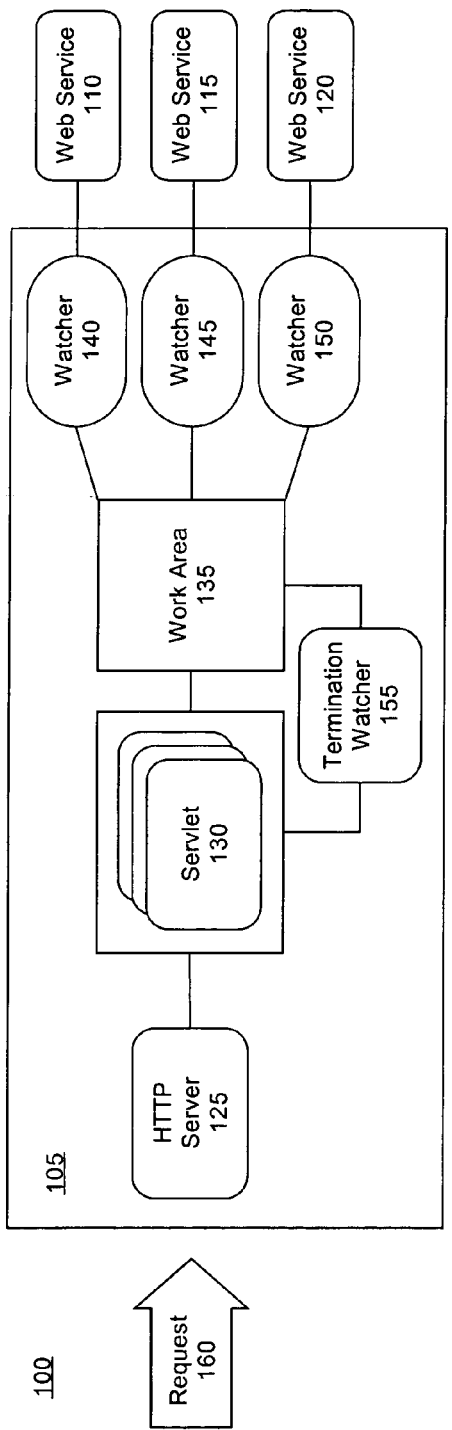
FIG. 1 is a schematic diagram illustrating a system for invoking pattern-based Web services in accordance with one aspect of the inventive arrangements disclosed herein.

FIG. 1 is a schematic diagram illustrating a system 100 for invoking pattern-based Web services in accordance with one aspect of the inventive arrangements disclosed herein. As shown, the system 100 can include a core server 105 and several Web services 110, 115, and 120.

The core server 105 can be implemented as a computer system or other information processing system including but not limited to a general purpose computer system and/or a server computer system. The core server 105 can include a Hypertext Transfer Protocol (HTTP) Server application 125 (hereafter HTTP server), a collection of one or more servlets 130, a common memory space 135 and one or more watchers 140, 145, and 150. A termination watcher 155 can be included as well.

The HTTP server 125 can receive requests 160 and send responses to received requests. The HTTP server 125, for example, can receive requests formatted according to Simple Object Access Protocol (SOAP), and decode such requests. Further, responses also can be formatted as SOAP responses. The servlets 130 can be configured to extract a pattern object from received requests. The pattern object can specify a name, a string of characters, a sequence of numbers, rules, another object, or any other structure that can be held by an object. The servlets 130 can extract pattern objects from received requests and place the pattern objects in the work area 135. The servlets 130 further can provision the termination watcher 155 to monitor the pattern object.

When processing upon the pattern object is completed by the various Web services 110-120, the servlets 130 receive the pattern object, whether modified or in the same condition as originally extracted from the request 160, and formulate a response to be sent to the requestor.

The work area 135 is a common memory space or portion of memory that can be used to store pattern objects extracted from received requests 160. The work area is accessible by each of the watchers 140, 145, and 150, the termination watcher 155, as well as the servlets 130. Watchers 140, 145, and 150 are software objects that can monitor or scan the work area 135. Each of the watchers is associated with a particular Web service as shown. Each watcher further can include one or more rules for determining when to invoke its associated Web service. The watchers 140-150 monitor the pattern object(s) placed in the work area 135. If a pattern object matches a rule specified within one of the watchers 140-150, that watcher invokes its associated Web service. While three watchers and corresponding Web services have been depicted, it should be appreciated that the core server 105 can include more watchers or fewer watchers depending upon the number of Web services that have been registered with the core server 105.

The termination watcher 155, like the other watchers 140-150, monitors the work area 135 for a pattern object that conforms or matches one or more rules within the termination watcher 155. The termination watcher 155 is provisioned by one of the servlets 130 when the pattern object is extracted and placed in the work area 135. When a pattern object is detected by the termination watcher 155 that conforms with one or more of the rules, the termination watcher 155 removes the pattern object from the work area 135 and returns the pattern object to the servlet 130 that originally extracted the pattern object from the received request.

While the termination watcher 155 can monitor for a pattern object of a particular format that matches the rules stored therein, the termination watcher 155 also can terminate the operation of one or more Web services by removing the pattern object from the work area after a detected fault, whether a time out condition or another fault. A time out condition, for example where the pattern object has been in the work area 135 for at least a predetermined amount of time, but does not conform to a rule within the termination watcher 155, can indicate that one or more of the Web services has not executed correctly or that some other fault condition has occurred.

Each of the Web services 140-150, can perform a particular task such as locating a Universal Resource Locator (URL) for determining telephone numbers, determining an electronic mail address when provided with a name, or determining a telephone number when provided a name or an electronic mail address. Those skilled in the art will appreciate that Web services can perform any of a variety of different processing tasks. As such, it should be appreciated that the examples of Web services disclosed herein are not intended to be a limitation on the range of functions or tasks that can be implemented by Web services.

In operation, the HTTP server 125 can receive a request 160. The HTTP server 125 can route the received request 160 to an available servlet 130 for further processing. For example, the request 160 can specify a particular servlet 130 as determined from a Web Services Description Language (WSDL) file corresponding to the requested Web services. The servlet 130 that receives the request can extract or parse the pattern object from the request 160. The servlet 130 then can store the pattern object within the common memory 135.

Each of the watchers 140-150 can continually monitor the work area 135 for a pattern object. When pattern object(s) are detected, the watchers 140-150 check the pattern object(s) to determine whether the pattern object corresponds with one or more rules contained with the watchers 140-150. If a watcher determines that the pattern object matches one of its rules, that watcher can invoke the Web service that has been associated with that watcher.

While the watchers 140-150 can invoke Web services in sequential fashion, in another embodiment of the present invention, the watchers 140-150 can monitor for pattern objects within the work area 135 in parallel fashion and run concurrently with one another. Accordingly, Web services 110-120 also can be invoked in parallel fashion. Web services 110-120 can continue to operate until the termination watcher 155 detects a termination criterion. For example, detecting a termination criterion can include, but is not limited to, determining that one or more rules contained within the termination watcher 155 match the pattern object or detecting a fault such as a time out. At that time, the termination watcher 155 returns the pattern object to the servlet 130 that extracted the pattern object from the request 160. The servlet 130 then formulates a response that is sent to the requestor via the HTTP server 125.

Figure 2:
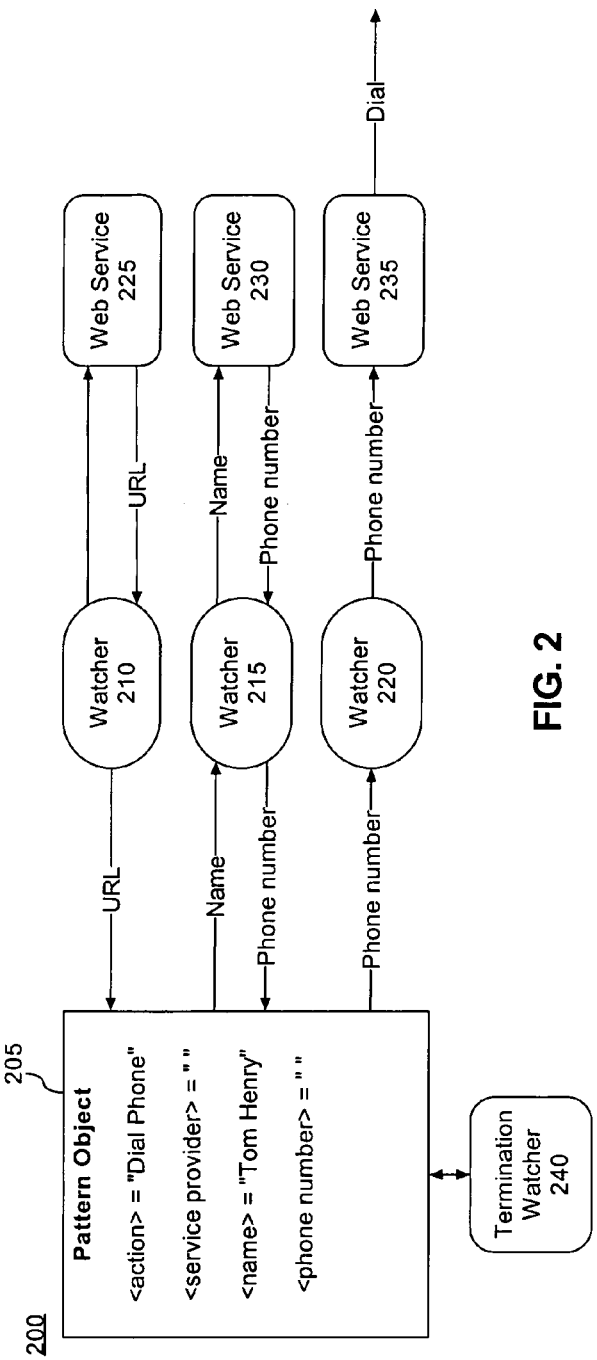
FIG. 2 is a schematic diagram illustrating another aspect of a system for invoking pattern-based Web services in accordance with the inventive arrangements disclosed herein.

FIG. 2 is a schematic diagram illustrating another aspect of a system 200 for invoking pattern-based Web services in accordance with the inventive arrangements disclosed herein. As shown, system 200 illustrates the interaction of watchers 210, 215, and 220, the termination watcher 240, Web services 225, 230, and 235, and a pattern object 205.

The pattern object 205, as was described with reference to FIG. 1, is extracted from a received request by a servlet and stored in the work area. The pattern object specifies one or more tasks that must be performed to execute a more complex action. In this case, by way of example, the pattern object 205 pertains to telephony services. The pattern object specifies a "dial phone" action and provides a name of "Tom Henry". A service provider and a telephone number, however, are not specified in the pattern object 205. Accordingly, to execute the action of dialing a phone, one or more additional tasks, each performed by a particular Web service, must be performed.

In this example, Web service 225 can return a URL of another Web service that can dial a telephone number. Web service 230 can return a telephone number if provided a name. Web service 235 can dial a telephone number. As each Web service 225-235 is registered with the core server, a watcher is assigned to each Web service. Upon registration, each Web service provisions rules within the watcher associated with that Web service.

For instance, Web service 225, when registered with the core server can provision a rule within assigned watcher 210 which states that if a pattern object has a blank service provider attribute, watcher 210 will invoke Web service 225. As shown, Web service 225 determines a URL for the service provider attribute of the pattern object 205 and provides the URL to watcher 210. Watcher 210 then can modify the pattern object 205 by writing the URL to pattern object 205 while in the work area so that the service provider attribute specifies the URL determined by Web service 225.

When Web service 230 is registered with the core server, watcher 215 can be assigned. Web service 230 can provision a rule within watcher 215 which states that if the phone number attribute of the pattern object 205 is blank, and a name is available, then Web service 230 will be invoked. Accordingly, as shown, watcher 215 invokes Web service 230. Watcher 215 can provide Web service 230 with a name so that a phone number can be retrieved. Web service 215 provides the phone number to watcher 215, which writes the phone number to the pattern object 205 so that the phone number attribute specifies the phone number provided by Web service 230.

Watcher 220 can be associated with Web service 235 when registered with the core server. At that time, Web service 235 can provision a rule within watcher 220 which states that no action is to be taken until all of the attributes of the pattern object 205 have been completed. At that time, watcher 220 can invoke Web service 235. Accordingly, watcher 220 can provide the phone number to Web service 235, in addition to any other attributes that may be required, so that Web service 235 can dial the provided number.

From the example, it should be appreciated that the rules provisioned in the watchers 210-220 can be applied concurrently. Thus, each watcher can monitor the work area for one or more pattern objects that match the rules of each watcher. Each watcher that detects a match can invoke the associated Web service. For example, Web service 225 and Web service 230 can execute concurrently. After the phone number is dialed, watcher 220 can end or, alternatively, can modify the pattern object 205 by adding an identifier or some other reference prior to terminating execution. The termination watcher 240, which also monitors the pattern object 205 to determine when the pattern object 205 conforms with provisioned rules stored therein, can determine that the pattern object 205 now conforms with such rules. Accordingly, the termination watcher 240 can remove the pattern object 205 from the work area and return the pattern object 205 to the servlet 130.

In one embodiment of the present invention, the termination watcher 240 also can modify the pattern object 205 with an indication as to whether the Web services have executed properly or a fault has occurred. In another embodiment, the termination watcher 240 can simply return the pattern object 205 to the servlet and provide a separate notification as to whether the Web services were implemented correctly or a fault occurred.

Figure 3:
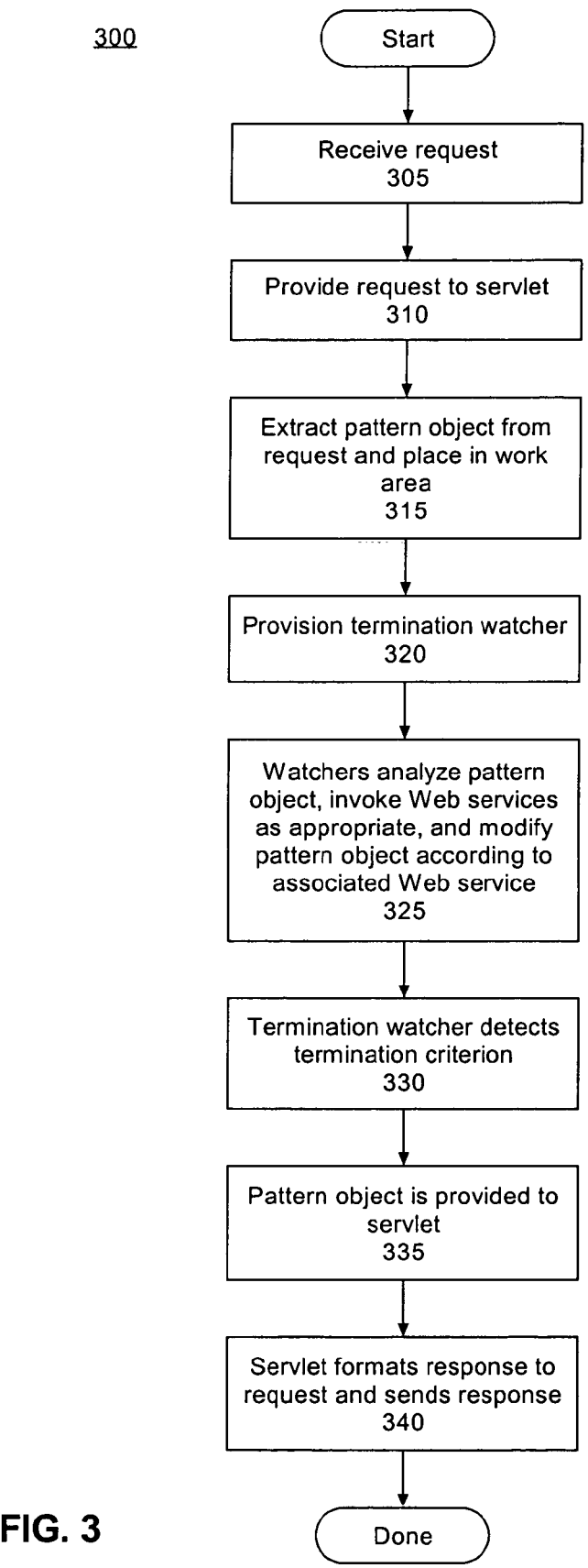
FIG. 3 is a flow chart illustrating a method of processing complex requests for Web services in accordance with another aspect of the present invention.

FIG. 3 is a flow chart illustrating a method 300 for processing complex requests for Web services in accordance with another aspect of the present invention. The method can begin in a state where one or more Web services have been registered with the core server. Accordingly, each Web service can be associated with a watcher. That is, a watcher can be instantiated for each Web service registered with the core server. Each Web service further can provision one or more rules within each associated watcher as specified within each Web service.

In step 305, a request such as a SOAP request can be received by the HTTP server disposed within the core server. The HTTP server can select an available one of the servlets and forward the request to the selected servlet in step 310. In step 315, the servlet can receive and process the request. More particularly, the servlet can extract a pattern object from the received request and store the pattern object in the work area. As noted, the pattern object can specify one or more services to be invoked, thereby enabling the initiation of more than one Web service via a single request.

In step 320, the servlet can provision one or more rules within the termination watcher. It should be appreciated that the request or the pattern object itself can specify the termination rules to be provisioned and applied with respect to the termination watcher. Accordingly, if so configured, each request can provision one or more different termination rules which specify different conditions for detecting the completion of execution of the combination of Web services specified by the pattern object as well as different faults which also can vary with the combination of Web service specified by the pattern object.

In step 325, once the termination watcher has been provisioned and the pattern object has been placed in the work area, the watchers can begin analyzing the pattern object. As noted, the watchers can monitor the pattern object in parallel and invoke Web services as appropriate when the pattern object is determined to match a rule of one or more of the watchers. Accordingly, the Web services can operate sequentially, concurrently, or both sequentially and concurrently as invoked by the watchers. The watchers also can modify the pattern object according to the Web service associated with each watcher. In consequence, each watcher scans the work area each time a pattern object in the work area changes.

Thus, for example, a second watcher can determine that the pattern object matches a rule stored therein after the pattern object has been modified by a first watcher responsive to the execution of the Web service associated with the first watcher. It should be appreciated that as each watcher can monitor the pattern object concurrently and modify the pattern object, a chain Web services can be invoked to operate concurrently, serially, or both concurrently and serially as the pattern object continues to be modified by watchers.

In step 330, the termination watcher can detect a termination criterion. More particularly, the termination watcher can determine that the pattern object matches a rule for termination or determine that a fault has occurred. In either case, the termination watcher can remove the pattern object from the work area, whether the pattern object has been modified or is in the same condition as when initially placed in the work area. In step 335, the termination watcher can provide the pattern object to the same servlet that extracted the pattern object. As noted, the termination watcher can inform the servlet of the status of the execution of the Web services by indicating that the Web services have executed successfully or that a fault occurred. This information can be included within a message to the servlet or can be included within the pattern object itself.

In step 340, the servlet can build a response to be sent to the requester. The response can include the pattern object, whether in its original or modified form. The response also can specify whether the Web services executed successfully or a fault occurred, for example whether a time out or another execution error occurred. This information can be included within the response by either including the information within some portion of the response itself or including the information within the pattern object as previously discussed.

The present invention provides a solution for implementing a plurality of Web services responsive to a single complex request. Rather than receive multiple requests, each triggering the execution of a single Web service as part of a larger action, according to the embodiments disclosed herein, multiple Web services can be invoked responsive to detecting a pattern object that matches or conforms with one or more rules within watcher objects that correspond to each Web service. As such, actions that previously required the issuance of several individual requests for Web services can be performed responsive to a single request. The inventive arrangements disclosed herein further can speed the manner in which Web services are delivered as the Web services can be invoked in a more streamline and automated fashion.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of processing a request for a plurality of Web services comprising the steps of:
    receiving a request specifying at least two Web services;
    extracting an object pattern from the request;
    storing the object pattern from the request in a common memory;
    scanning the common memory with at least two watchers, wherein each watcher is assigned to a Web service and a rule for invoking an associated one of the at least two Web services;
    detecting that the object pattern matches the rule of one of the at least two watchers,
    wherein a first watcher having a rule matching the object pattern invokes an associated one of the at least two Web services, wherein the one of the at least two invoked Web services instructs the first watcher to modify the object pattern;
    modifying the object pattern by the first watcher according to instructions from the associated one of the at least two Web services;
    detecting by a second watcher that the modified object pattern matches the rule assigned to the second watcher;
    invoking by the second watcher the other one of the at least two Web services assigned to the second watcher;
    detecting a termination criterion by a termination watcher, wherein a rule within the termination watcher matches the pattern object; wherein the termination watcher returns the pattern object back to at least one servlet; and
    sending a response to the request by the at least one servlet.

2. The method of claim 1, wherein each watcher scans the common memory in parallel such that more than one Web service can be invoked concurrently.

3. The method of claim 1, wherein the at least two watchers of the detecting step invoke an associated one of the Web services sequentially.

4. The method of claim 1, further comprising watchers continuing to invoke Web services until a termination watcher detects a termination criterion and removes the pattern object from the common memory.

5. The method of claim 4, wherein the response specifies, at least in part, the pattern object.

6. A system comprising a processor for processing complex requests for Web services; wherein said system comprising:
   A Hypertext Transfer Protocol server configured to receive a request for at least two Web services;
   At least one servlet configured to extract a pattern object from the request; wherein the pattern object specifies the at least two Web services;
   A common memory that temporarily stores the pattern object while the specified at least two Web services being executed;
   At least two watchers wherein each watcher is assigned to a Web service and a rule for invoking an associated one of the at least two Web services, wherein:
      The at least two watchers scanning the common memory in parallel to determine whether the stored pattern object matches the assigned rule for invoking a Web service associate with each watcher;
      a first watcher having a rule matching the object pattern invokes an associated one of the at least two Web services, wherein the one of the at least two invoked Web services instructs the first watcher to modify the object pattern;
      the first watcher modifying the object pattern according to instructions from the associated one of the at least two Web services;
      detecting by a second watcher that the modified object pattern matches the rule assigned to the second watcher;
      the second watcher invoking the other one of the at least two Web services assigned to the second watcher;
      a termination watcher detecting a termination criterion wherein a rule within the termination watcher matches the pattern object; wherein the termination watcher returns the pattern object back to the at least one servlet; and
      the at least one servlet sending a response to the request.

7. The system of claim 6, wherein said watchers scan said common memory in parallel such that more than one Web service can execute concurrently.

8. The system of claim 6, wherein said watchers invoke more than one Web service sequentially.

9. A computer readable storage; having stored thereon a computer program having a plurality of code sections executable by a processor for causing the computer to perform the steps of:
   receiving a request specifying at least two Web services;
   extracting an object pattern from the request;
   storing the object pattern from the request in a common memory;
   scanning the common memory with at least two watchers, wherein each watcher is assigned to a Web service and a rule for invoking an associated one of the at least two Web services;
   detecting that the object pattern matches the rule of one of the at least two watchers, wherein a first watcher having a rule matching the object pattern invokes an associated one of the at least two Web services, wherein the one of the at least two invoked Web services instructs the first watcher to modify the object pattern;
   modifying the object pattern by the first watcher according to instructions from the associated one of the at least two Web services;
   detecting by a second watcher that the modified object pattern matches the rule assigned to the second watcher;
   invoking by the second watcher the other one of the at least two Web services assigned to the second watcher;
   detecting a termination criterion by a termination watcher, wherein a rule within the termination watcher matches the pattern object; wherein the termination watcher returns the pattern object back to at least one servlet; and
   sending a response to the request by the at least one servlet.

10. The computer readable storage of claim 9, wherein each watcher scans the common memory in parallel such that more than one Web service can be invoked concurrently.

11. The computer readable storage of claim 9, wherein the at least two watchers of the detecting step invoke an associated Web service sequentially.

12. The computer readable storage of claim 9, further causing the watchers to continue invoking Web services until a termination watcher removes the pattern object from the common memory.

13. The computer readable storage of claim 12, wherein the response specifies, at least in part, the pattern object.

14. A system for processing a request for a plurality of Web services comprising:
   means for receiving a request specifying at least two Web services;
   means for extracting an object pattern from the request;
   means for storing the object pattern from the request in a common memory;
   means for scanning the common memory with at least two watchers, wherein each watcher is assigned to a Web service and a rule for invoking an associated one of the at least two Web services;
   means for detecting that the object pattern matches the rule of one of the at least two watchers, wherein a first watcher having a rule matching the object pattern invokes an associated one of the at least two Web services, wherein the one of the at least two invoked Web services instructs the first watcher to modify the object pattern;
   means for modifying the object pattern by the first watcher according to instructions from the associated one of the at least two Web services;
   means for detecting by a second watcher that the modified object pattern matches the rule assigned to the second watcher;
   means for invoking by the second watcher the other one of the at least two Web services assigned to the second watcher;
   means for detecting a termination criterion by a termination watcher, wherein a rule within the termination watcher matches the pattern object; wherein the termination watcher returns the pattern object back to at least one servlet; and means for sending a response to the request by the at least one servlet.

15. The system of claim 14, wherein said means for scanning scan said means for storing such that more than one Web service can be invoked concurrently.

16. The system of claim 14, wherein said means for scanning invoke at least two of the Web services sequentially.

17. The system of claim 14, wherein the response specifies, at least in part, the pattern object.

* * * * *